Aug. 5, 1952     P. H. KARLSSON ET AL     2,605,646

DRIVING RACK MECHANISM

Filed Sept. 1, 1948

PER HILMER KARLSSON
and JOHN R. LIDFORD
INVENTORS

BY

Patented Aug. 5, 1952

2,605,646

UNITED STATES PATENT OFFICE 2,605,646

DRIVING RACK MECHANISM

Per Hilmer Karlsson, Wellsville, and John A. Lidford, Friendship, N. Y., assignors to The Air Preheater Corporation, New York, N. Y.

Application September 1, 1948, Serial No. 47,236

1 Claim. (Cl. 74—415)

The present invention relates to heat exchange apparatus and particularly to an improved driving means for the rotor of a rotary regenerative air preheater or the like.

A conventional regenerative air preheater of the Ljungstrom type includes a rotor carrying heat absorbing surface in the form of metallic plates that are first positioned in a gas passage to absorb heat and then upon turning of the rotor become disposed in the air passage to impart heat to air flowing therethrough. Although a majority of air preheaters have a central drive utilizing a motor and gear reduction connected directly to the rotor posts, some rotors are provided with a driving rack extending circumferentially of the outer cylindrical wall of the rotor. As the rotor structure turns it is subjected to high temperature gases and this sometimes results in excessive distortion of the driving rack due to temperature variations of the rotor causing expansion of the latter. Inasmuch as the motor driven pinion that engages the rack for turning the rotor is mounted in a fixed position with respect to the rotor the distortion of the rack causes binding between it and the driving pinion with excessive wear of both among other disadvantageous conditions.

An object of the present invention is to obviate the above mentioned disadvantages by providing what may be termed as semi-flexible mounting for the drive rack. The invention will be best understood upon consideration of the following detailed description of an illustrative embodiment thereof when read in conjunction with the accompanying drawing in which.

Figure 1:
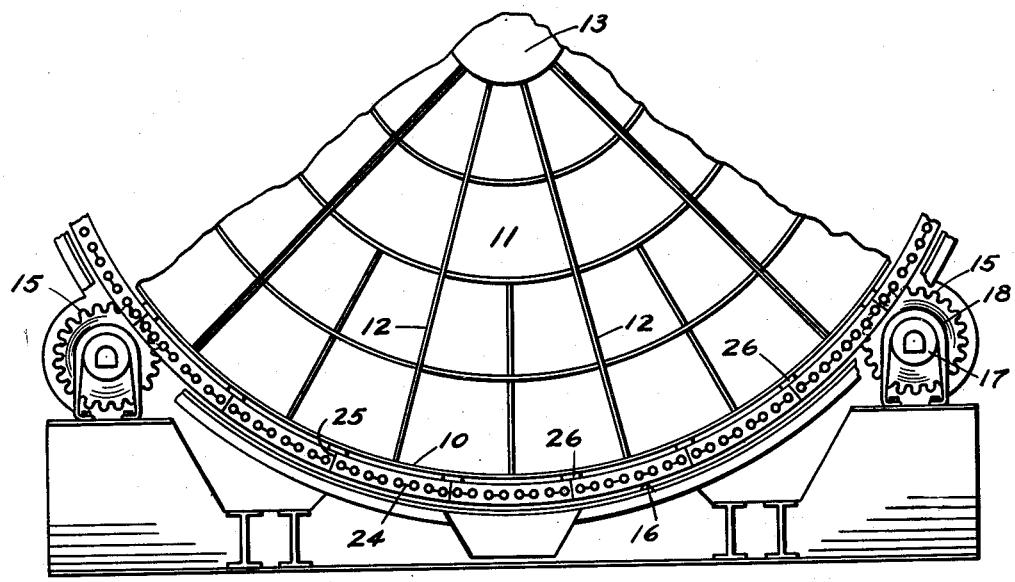
Figure 1 is a schematic elevational view of the lower half of an air preheater rotor turning on a horizontal axis and utilizing a mounting for the drive rack embodying the present invention.
Figure 2:
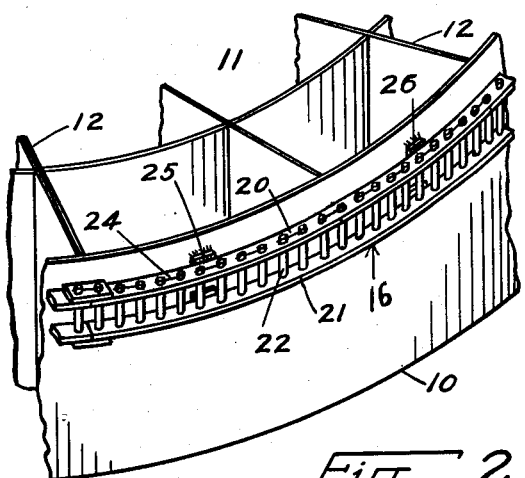
Figure 2 is a fragmentary perspective view on an enlarged scale illustrating the mounting for the drive rack shown in Figure 1.

In the drawings the numeral 10 designates the cylindrical shell of a rotor which is divided into sector shaped compartments 11 by radial partitions 12 connecting it with the rotor post 13. The rotor compartments 11 contain regenerative heat transfer material in the form of metallic plates which are spaced apart to form passages parallel to the rotor axis. The plates first absorb heat from hot gases flowing through the gas passage of the preheater and as the rotor turns slowly about its axis the heated plates are moved into a stream of air flowing through the air passage, the heated air being eventually conveyed to a boiler furnace or further place of use. For the purpose of turning the rotor about its axis a pinion 15 driven by a motor 17 through reduction gearing 18 engages a tooth rack designated as a whole by the numeral 16 that extends circumferentially of the rotor and is attached to the outer surface of the rotor shell 10.

Although some rotors utilize a gear rack comprising a solid metallic bar or ring formed on its outer periphery with machined gear teeth, the drive rack shown in the drawings consists of spaced segmental bars 20 and 21 formed with series of alined apertures receiving metal pins 22 held in place in the bars by cotter pins 24. Such constructions are conventional and are known as pin racks.

However, in accordance with the present invention the drive rack 16 which is made up of a plurality of segmental sections welded together at 25 where they abut to form a complete circular ring and the ring is attached to the rotor shell 10 by means of a plurality of circumferentially spaced mounting blocks 26 located between the shell 10 and rack 16 and fixed to both of these parts, as by welding. The mounting blocks 26 not only space the drive rack 16 outwardly of the rotor shell 10 but in accordance with the invention they are located circumferentially at points that are not in alinement with, or opposite, the ends of any of the radial partitions 12 that divide the interior of the rotor to form the compartments 11. The mounting blocks 26 may be located half way between the radial partitions. Excessive distortion of the rack due to temperature variation of the rotor structure is avoided because the partitions 12 do not exert a thrust on the drive rack 16 and the shell plate 10 of the rotor acts more or less as a diaphragm to provide a semi-flexible mounting for the pin rack.

Figure 3:
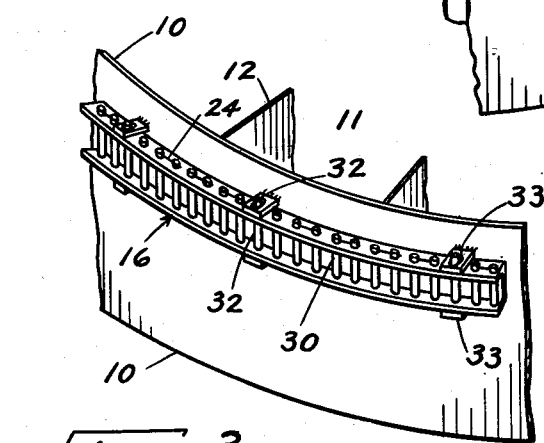
Figure 3 is a similar perspective view of a modified type of mounting for the drive rack.

In the form shown in Figure 3 the rack bars 20, 21 are provided with mounting studs 30 that extend into elongated slots 32 in mounting brackets 33 mounted above and below the rack bars 20, 21, respectively, and attached to the rotor shell 10 as by welding. With this form also expansion of the rotor upon being heated may take place without distorting the drive rack 16 since the pins 30 may move radially in the slots 32 of the brackets 33.

With both forms of rack mounting described above the rotor structure may expand without producing a corresponding movement of the drive rack which would distort it and consequently the driving relation between the driving rack 16 and pinion 15 is maintained without binding and excessive wear of these parts is eliminated.

What we claim is:

In apparatus having a rotor comprising a cylindrical shell made of a metal that flexes under stress connected by radially extending members to a rotor post and subjected to distortion due to unequal heating of portions thereof, and an annular driving rack extending circumferentially of the rotor and having a diameter somewhat greater than that of the latter so as to be spaced radially therefrom; means attaching said driving rack to the rotor consisting of mounting blocks attached to the rotor and to the rack in the space therebetween at points that are spaced circumferentially of the rotor and located only in the intervals between and out of alinement with said radial members so that the expansion of said members causes said shell to flex in areas between said blocks.

PER HILMER KARLSSON.
JOHN A. LIDFORD.

REFERENCES CITED

The following references are of record in the file of this patent:

UNITED STATES PATENTS

| Number | Name | Date |
|---|---|---|
| 773,362 | Anderson | Oct. 25, 1904 |
| 1,237,443 | Aldrich | Aug. 21, 1917 |
| 2,313,081 | Ljungstrom | Mar. 9, 1943 |
| 2,441,901 | Petersen | May 18, 1948 |